United States Patent

[11] 3,584,143

[72] Inventors Nathan Gold
Framingham;
Richard F. Weeks, Lexington, both of, Mass.
[21] Appl. No. 793,059
[22] Filed Jan. 22, 1969
[45] Patented June 8, 1971
[73] Assignee Polaroid Corporation
Cambridge, Mass.

[54] FACSIMILE DUPLICATION OF DOCUMENTS BY MEANS OF DIGITAL SIGNALS
21 Claims, 7 Drawing Figs.

[52] U.S. Cl. .......... 178/6.8, 178/6, 179/15.55
[51] Int. Cl. .......... H04n 1/02, H04n 1/04, H04n 7/12
[50] Field of Search .......... 178/6 BWR, 6.8; 179/15.55

[56] References Cited

UNITED STATES PATENTS

| | | | |
|---|---|---|---|
| 2,909,601 | 10/1959 | Fleckenstein ................ | 178/6.8 |
| 3,128,338 | 4/1964 | Teacher .................... | 178/6 |
| 3,428,744 | 2/1969 | Green ...................... | 178/6 |

*Primary Examiner*—Terrell W. Fears
*Assistant Examiner*—Howard W. Britton
*Attorneys*—Brown and Mikulka, William D. Roberson and Gerald L. Smith

ABSTRACT: This specification discloses a facsimile system for duplicating documents at a remote location by means of digital signals transmitted over a conventional telephone line. The system scans the original document to determine the position of transitions in the original documents and digitally encode these positions. The resulting digital signals are transmitted to a remote location where a receiver in response to the received signals produces a facsimile of the original document. In the scanning of the original document, horizontal lines of the document are repeatedly scanned at a high rate and on each horizontal scan of a line, the position of only one or two transitions is encoded. The scanning of each horizontal line is repeated until all the transitions have been encoded. The resulting encoded positions are transmitted to a remote receiver as they are encoded. During each scan, usually, the position of a white-to-black transition in the scanned line is encoded and the relative position of the following black-to-white transition in the scanned line is encoded. The positions of a pair of such transitions are encoded during a single scan if the black-to-white transition of such pair closely follows the white-to-black transition of such pair. If the black-to-white transition does not closely follow the white-to-black transition, then the position of the black-to-white transition is encoded on the next following scan of the line.

INVENTORS
NATHAN GOLD &
RICHARD F. WEEKS

BY Brown & Mikulka and
Richard L. Aitken
ATTORNEYS

INVENTORS
NATHAN GOLD &
RICHARD F. WEEKS

BY Brown & Mikulka and Richard L. Aitken
ATTORNEYS

INVENTORS
NATHAN GOLD &
RICHARD F. WEEKS

BY Brown & Mikulka and Richard L. Aitken
ATTORNEYS

INVENTORS
NATHAN GOLD &
RICHARD F. WEEKS

BY Brown & Mikulka and Richard L. Aitken
ATTORNEYS

FACSIMILE DUPLICATION OF DOCUMENTS BY MEANS OF DIGITAL SIGNALS

BACKGROUND OF THE INVENTION

This invention relates to facsimile document duplication by means of signals transmitted over telephone lines and, more particularly, to such a document duplication system in which the content of the original document is represented by digital signals which are transmitted over the telephone lines.

It is often desirable in connection with a telephone call to be able to send over the telephone line graphic information which is difficult to describe verbally. The information could be in the form of a mechanical drawing, a pencil sketch, an invoice, or even a printed or typewritten page. Facsimile systems currently on the market will perform such remote document duplication. These systems mechanically scan the document to be duplicated at a slow constant speed to generate a low frequency video signal which can be transmitted over telephone lines. The scanning rate must be slow enough so that the video signal does not exceed the bandwidth of the telephone line over which the signal is to be transmitted. As a result, it takes a long time to transmit each page with this equipment.

A common characteristic of most graphic information to be transmitted is that it usually consists entirely of black or dark lines on a white or light background. There are normally no shades of grey to be transmitted and, accordingly, there is no need to transmit information representing the different shades of grey as would be required in the transmission of a photograph. Accordingly, a document can be transmitted more efficiently by transmitting only signals representing the positions of each white-to-black transition and each black-to-white transition that is encountered as the document is scanned. Some of the systems of the prior art improve over the telephone facsimile system presently on the market described above in that they represent the position of the black-to-white transitions digitally and transmit the digital signals over the telephone lines to the receiver. Many of these systems of the prior art are also inefficient in that the scanning of the original document must still be slow enough to transmit the position of each transition as it is scanned and before the next transition is encountered. Time is wasted in that the slow scan rate also takes place over blank white pages of the document as well as portions of the document which contain many transitions. One system of the prior art improves the efficiency of the operation by scanning the blank areas at a high rate and then scanning the areas of the document which contain transitions at a slow rate. Another system of the prior art improves the efficiency by scanning at a high rate of speed but stopping the scanning each time a transition is detected to take time to transmit its position and then restarting the scan when the position has been encoded and transmitted. Since the system will scan over the white or blank portions of the document at high speed, the time to transmit the document is considerably reduced. However, both of these systems of the prior art require complex, expensive scanning apparatus.

The system of the present invention improves on the system of the prior in that it scans at a high speed over the blank areas and thus greatly reduces the time required for transmission of each document page. Moreover, the system can be implemented with relatively simple inexpensive circuitry to accurately detect and transmit the position of each transition.

SUMMARY OF THE INVENTION

In accordance with the present invention, each horizontal line of the document is repeatedly scanned at a high rate with the positions of only one or two transitions on the scanned line being transmitted with each scan. The horizontal line is repeatedly scanned until all of the transitions have been transmitted. Thus if there are no transitions on the line or only a few, the time for scanning the line is reduced accordingly. It is normally expected that a black-to-white transition will closely follow most white-to-black transitions. Accordingly, to increase the efficiency of the system on a given scan, the position of a white-to-black transition will be detected and encoded and the relative position of the following black-to-white transition will be detected and encoded if it closely follows the preceding white-to-black transition. If the following black-to-white transition does not closely follow the preceding white-to-black transition, then the position of this black-to-white transition is encoded on the following scan. When all of the transition positions on a given line have been transmitted, the system then is stepped to scan the next adjacent horizontal line until all the lines of the document have been scanned. The positions of each of the transitions are encoded digitally and this digital information is transmitted to the receiver which utilizes the information to control an electron beam to reproduce the document.

Accordingly, an object of the present invention is to provide an improved system for duplicating an original document at a remote location.

Another object of the present invention is to provide a high speed system for duplicating a document at a remote location by means of signals transmitted over telephone lines.

A further object of the present invention is to reduce the cost of high speed facsimile duplication equipment for duplicating documents at remote locations by means of signals transmitted over a narrow bandwidth.

Further objects and advantages of the present invention will become readily apparent as the following detailed description of the invention unfolds and when taken into conjunction with the drawings.

DETAILED DESCRIPTION OF THE PREFERRED EMBODIMENTS

Figure 1:
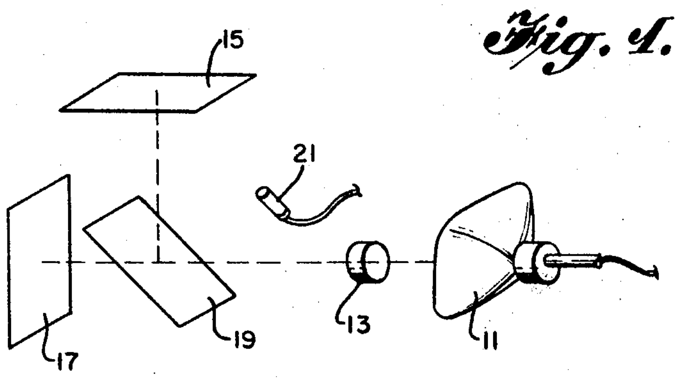
FIG. 1 schematically illustrates the facsimile apparatus of the present invention, which apparatus can be used to either transmit or receive.

The apparatus schematically illustrated in FIG. 1 can either be used as a transmitter or a receiver. When it is used as a transmitter, it will scan a document to be duplicated at a remote location and circuitry associated with the apparatus will generate digital signals from which the document can be duplicated. The digital signals will then be transmitted over a conventional telephone line to remotely located similar apparatus operating as a receiver. Circuitry associated with the apparatus operating as a receiver will convert the received digital signals to a form to control the apparatus to duplicate the document. Thus a complete transmitting and receiving facsimile system will comprise two apparatus such as shown in FIG. 1 interconnected by a telephone line or other transmission channel.

The apparatus shown in FIG. 1 comprises a flying spot scanner 11 in the form of a high resolution TV picture tube. The scanner 11 generates a spot of light which is repeatedly scanned horizontally across the face of the tube. The spot of light is focused by a lens 13 either on an original document 15 to be transmitted when the system is operating as a transmitter or on photographic paper 17 on which the reproduction is to take place when the system is operating as a receiver. A mirror 19 reflects the light from the scanner 11 to focus on the original 15 when the system is operating as a transmitter. The mirror 19 flips out of the way to permit the light to be focused on the photographic paper when the system operates as a receiver. As a result, when the system is operating as a transmitter, a spot of light will be repeatedly scanned horizontally across the original to be transmitted. A photomultiplier tube 21 detects the light reflected from the original 15 as the spot of light scans across the original 15 to provide a video signal representing the content of the horizontal line scanned by the spot of light. When the system is operated as a receiver, the horizontal sweep circuitry of the scanner 11 acts to repeatedly sweep the spot of light horizontally across the face of the scanner. Within the picture tube comprising the scanner, the electron beam is turned on and off at appropriate times during the horizontal sweep so that the spot of light will be turned on or off as the spot moves horizontally across the photographic paper 17. In this manner, the transmitted document will be photographically recorded on the photographic paper 17.

When the apparatus is operating as a transmitter, the spot of light will traverse changes in the document from light to dark and from dark to light. In a document which is black lines or printing on a white background, the light will traverse changes from white to black and from black to white. These changes are all referred to as transitions and for convenience all of the light-to-dark changes shall be referred to as white-to-black transitions and all of the dark-to-light changes will be referred to as black-to-white transitions.

Figure 2:
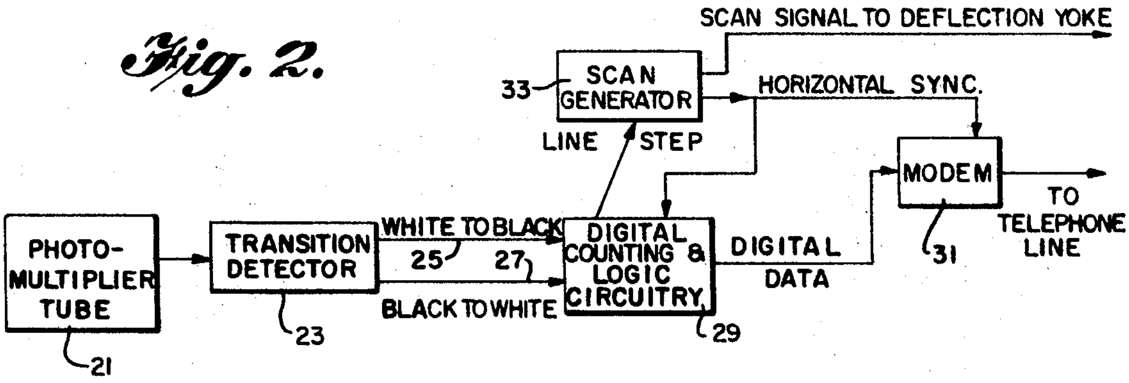
FIG. 2 is a schematic block diagram of the system of the present invention when operated as a transmitter.

When the system is operating as a transmitter, the video signal produced by the photomultiplier tube 21 as shown in FIG. 2 is fed to a transition detector 23, which detects from the video signal applied thereto each transition in the line as it is scanned by the flying spot of light. The transition detector 23 will produce a pulse on output channel 25 each time it detects a white-to-black transition and will produce a pulse on output channel 27 each time it detects a black-to-white transition. The transition detector 23 may be a differentiator followed by negative and positive pulse amplitude discriminators.

The pulses on channels 25 and 27 are fed to digital counting and logic circuitry 29, which generates digital signals representing the horizontal positions of the transitions. These digital signals are transmitted to the modem 31, which converts the applied digital signals to a form suitable for transmission on telephone lines and transmits the signals by telephone line to a receiver. The modem, for example, may be a Bell System Data Phone.

In accordance with the present invention, scan generator 33 controls the sweep of the flying spot scanner 11 to repeatedly scan the same horizontal line. The digital counting and logic circuitry 29 produces digital numbers representing the positions of just one or two transitions in the scanned line on each scan of the line and these digital numbers are transmitted at the end of the scan by the modem 31. When the positions of all of the transitions on the scanned line have been transmitted, the digital counting and logic circuitry steps the scan generator 33 to cause the scanner 11 to scan the next adjacent horizontal line and the process is repeated. If no transitions exist in a scanned line then this line is scanned only once. This process is continued until the entire original document has been processed and all the positions of all the transitions transmitted.

In a conventional document each horizontal scan will begin on a white portion of the document and the first transition to be detected will be a white-to-black transition. Each white-to-black transition will be followed by a black-to-white transition and each black-to-white transition will usually be close to the preceding white-to-black transition. The system takes advantage of this usual condition of the black-to-white transitions closely following the preceding white-to-black transitions to improve the efficiency.

On the first horizontal scan of a line the digital counting and logic circuitry will produce a digital number representing the horizontal position of the first transition, which will be a white-to-black transition. If the following black-to-white transition is close to the first white-to-black transition, the digital counting and logic circuitry 29 will also produce a digital number representing the horizontal position of this following black-to-white transition relative to the preceding white-to-black transition on this first horizontal scan. On the second scan of the same horizontal line the digital counting and logic circuitry 29 will generate a digital signal to represent the position of the second white-to-black transition in the scanned line provided that the preceding black-to-white transition closely followed the preceding white-to-black transition. On this second scan, the digital counting and logic circuitry will also generate a digital number representing the relative position of the next black-to-white transition in the line if it closely follows the preceding white-to-black transition. On each following scan, digital numbers will be generated representing each successive white-to-black transition provided that the preceding black-to-white transition closely followed the preceding white-to-black transition. On each such following scan, a digital number will also be generated representing the next black-to-white transition if it closely follows the preceding white-to-black transition. In the instance when the black-to-white transition does not closely follow the white-to-black transition, then a digital number will be generated to represent that white-to-black transition on one scan and on the following scan a digital number of representing the horizontal position of the following black-to-white transition will be generated. Thus on each scan of the same horizontal line, digital numbers are generated representing the position of only one or two transitions. If a white-to-black transition is closely followed by a black-to-white transition, then digital numbers will be generated representing the positions of both these two transitions on a single scan. If the white-to-black transition is not closely followed by a black-to-white transition, then on one scan only a single number representing the position of this white-to-black transition will be generated and on the following scan only a single number will be generated representing the position of the following black-to-white transition. The digital counting and logic circuitry 29 transmits the digital signals as they are generated to the modem 31, which converts the digital signals and transmits the converted signals by telephone line to a remote receiver. When the circuitry detects that the positions of all of the transitions on the horizontal line have been transmitted, the digital counting and logic circuitry 29 sends a signal to the scan generator 33 to cause it to step the scanning by the scanner 11 to the next adjacent horizontal line. The repeated scanning process of this line will then be carried out until all of the transitions have been digitally represented and transmitted by the modem 31, whereupon the scan generator 33 will again vertically step the flying spot to scan the next adjacent line. This process is continued until the entire document has been scanned. In this manner, digital signals representing a facsimile of the document 15 are transmitted over the telephone line.

Because the system only transmits the relative position of a black-to-white transition on the same scan as the preceding white-to-black transition, if the black-to-white transition closely follows the preceding white-to-black transition, the relative position of the following black-to-white transition can be represented by only a small number of binary bits. In accordance with the preferred embodiment of the present invention, the horizontal position of each white-to-black transition is represented by a 10-bit binary number and the position of a closely following black-to-white transition is represented by a 3-bit binary number. If the following black-to-white transition is spaced so far from the preceding white-to-black transition that it can not be represented by a 3-bit binary number, then the horizontal position of this black-to-white transition will be represented by a 10-bit binary number determined on the following scan. The horizontal scanning rate is selected to correspond to the time required to transmit 13 binary bits, 10 bits for the white-to-black transition and 3 bits for the following black-to-white transition.

Because the flying spot repeatedly scans the same line at a high speed a number of times corresponding to the number of transitions in the line, very little time is wasted on the white or blank places on the document to be transmitted. Accordingly, the system efficiently transmits the content of the document. Moreover, because the scanning of each horizontal line is at a constant high speed, the scanning is relatively simple and inexpensive. Because the system transmits on the same horizontal scan the relative position of the black-to-white transitions which closely follow preceding white-to-black transition, the system operates even more efficiently since most black-to-white transitions can therefore be represented by only small 3-bit binary numbers rather than requiring transmission of a 10-bit binary number to represent each black-to-white transition.

Figure 3:
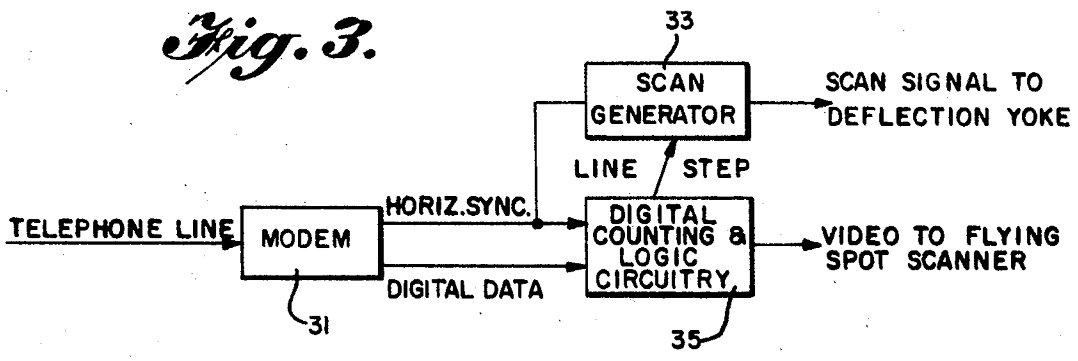
FIG. 3 is a schematic block diagram of the system when operated as a receiver.

When the system is operated as a receiver the data is received from the telephone line by the modem 31 as shown in FIG. 3. The modem converts the received signals to binary digital signals, which are applied to digital counting and logic circuitry 35. These digital signals represent the horizontal positions of the transitions in the scanned line of the document being transmitted in the manner which has been described with reference to FIG. 2. The modem 31 also derives horizontal synchronization pulses, one for each 13-bit digital word received by the modem and applies these horizontal synchronization pulses to the digital counting and logic circuitry 35 and also to the scan generator 33. The scan generator applies a horizontal sweep signal to the flying spot scanner synchronized with the received synchronization signal so that there is one horizontal sweep for each received set of digital signals. The scan generator 33 controls the vertical deflection in the flying spot scanner 11 so that it repeatedly scans the same line until it receives a signal from the digital counting and logic circuitry 35 to cause it to step to the next adjacent line and begin scanning that line. The digital counting and logic circuitry 35 will send such a signal to the scan generator 33 upon receiving the digital word from the modem 31 indicating that all the transitions in the present line have been transmitted. In response to the digital signals representing the positions of the transitions in the scanned line, the digital counting and logic circuitry 35 applies a video signal to the flying spot scanner 11 to turn the electron beam therein on and off at the appropriate times during each scan so that the original document is reproduced on the photographic paper. In the preferred embodiment, the system records on a negative type paper so that the beam of the flying spot scanner 11 is turned on to produce the black portions of each scanned line and is turned off to leave the remaining portions of each scanned line white to correspond with the white portions of the scanned document. If desired, the system could be easily modified to record on positive type paper. The video signal applied to the flying spot scanner 11 by the digital counting and logic circuitry 35 is such that on each scan of a horizontal line the beam is turned on only once to record one of the black portions in the line being scanned in the original document by the transmitter. Most of the black portions in a given line will be defined by a white-to-black transition closely followed by a black-to-white transition. As explained above, these transitions will be represented by a 10-bit number and 3-bit number transmitted together. When binary numbers representing such transitions are received, the digital counting and logic circuitry 35 will turn the electron beam in the scanner 11 on at the horizontal position represented by the received 10-bit binary number and then turn the beam off at the relative horizontal position represented by the 3-bit binary number received by the digital logic circuitry. In this manner, a black portion is recorded on the photographic paper corresponding to the black portion in the scanned line of the original document. If a black portion is so wide that the relative position of the black-to-white transition defining the trailing edge of the black portion can not be represented by a 3-bit binary number so that the white-to-black transition defining the leading edge is represented by a 10-bit number transmitted on one scan and the black-to-white transition is represented by a 10-bit number on the following scan, the digital counting and logic circuitry 35 does not turn the beam of the flying spot scanner 11 on at all during the horizontal scan thereof corresponding to the first 10-bit binary number representing the white-to-black transition. On the next scan, however, when the following 10-bit binary number has been received representing the black-to-white transition, the beam of the flying spot scanner is turned on first at the position determined by the 10-bit binary number representing the position of the white-to-black transition received on the previous scan and then is turned off at the position determined by the binary number representing the black-to-white transition. The beam of the flying spot scanner is caused to scan repeatedly in synchronization with the received binary numbers turning off an on only once during each scan until all the black portions of the scanned line have been recorded. At this time the digital counting and logic circuitry will cause the scan generator 33 to step to the next line and the process will be repeated. In this manner a facsimile of the transmitted document will be photographically recorded.

Figure 4:
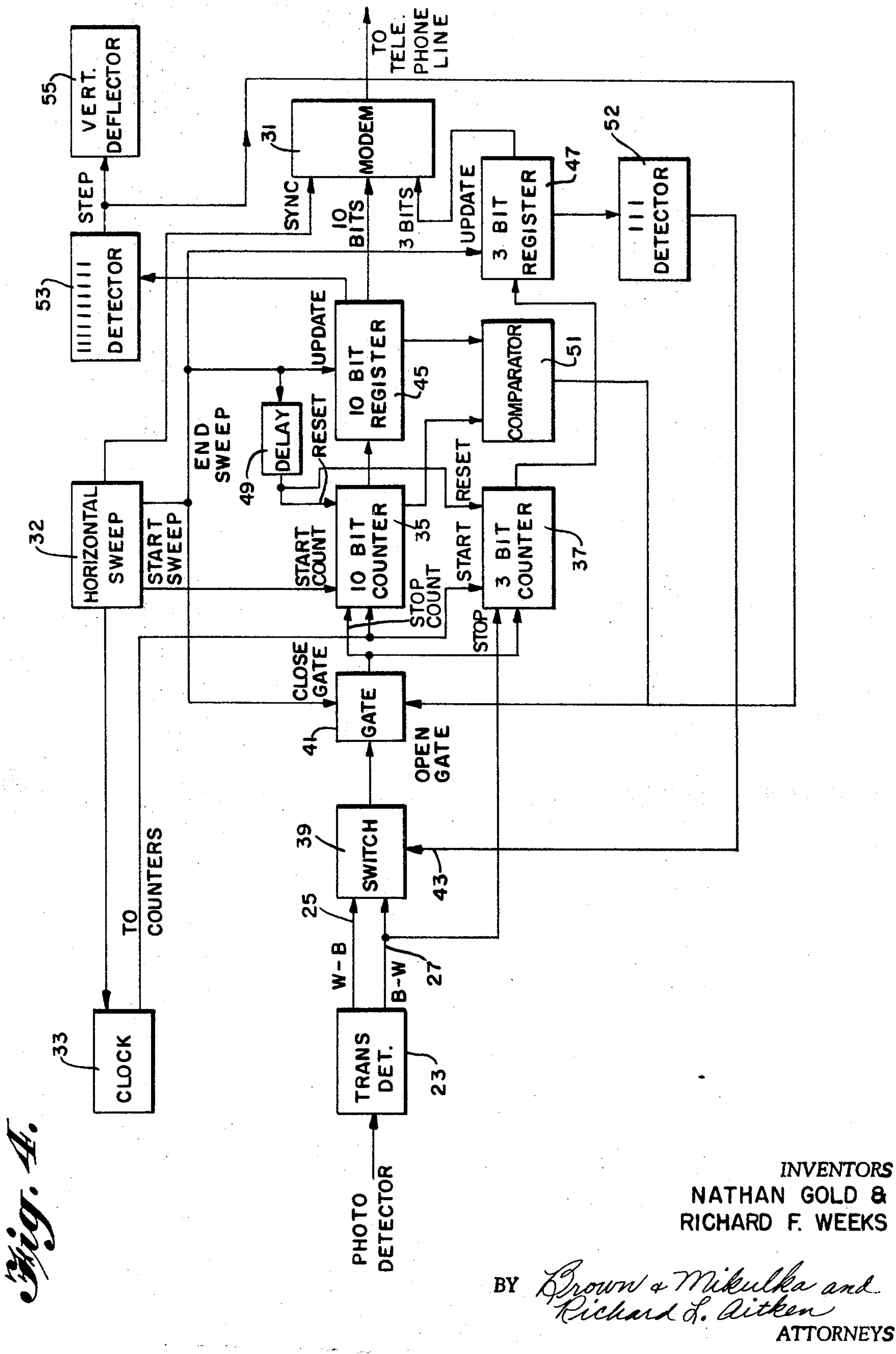
FIG. 4 is a more detailed block diagram illustrating the system of the present invention when operating as a transmitter.

As shown in FIG. 4, which illustrates the details of the digital counting and logic circuitry 29, the horizontal sweep circuitry, which generates the horizontal sweep signal applied to the flying spot scanner 11, is designated by the reference number 32. The horizontal sweep circuitry 32 also applies a synchronizing signal to a clock 33, which comprises an oscillator synchronized with the horizontal sweep signal. The frequency of the oscillator comprising the clock 33 is set so that the clock 33 produces 1,024 clock pulses during each horizontal scan of the flying spot scanner 11. The output pulses produced by the clock 33 are applied to a 10-bit binary counter 35 and a 3-bit binary counter 37.

The pulses produced on channels 25 and 27 by the transition detector 23 representing white-to-black transitions and black-to-white transitions, respectively, are applied to a switch 39. The switch 39 in its normal condition will pass the pulses produced on channel 25 to a gate 41 but can be switched by signals applied to an input 43 to transmit to the gate 41 pulses produced on channel 27 representing black-to-white transitions.

At the start of the first scan of horizontal line by the flying spot scanner, the switch 39 will be in its normal condition so that the pulse representing the first white-to-black transition in the horizontal line being scanned will be transmitted through the switch 39 to the gate 41. Prior to the start of the first scan, the 10-bit counter 35 and the 3-bit counter 37 will be set to register zero and the gate 41 will be opened. At the start of the first scan, the horizontal sweep circuit 32 will apply a signal to the 10-bit counter 35 to enable it to start counting the pulses applied thereto by the clock 33. Accordingly, the pulse produced on channel 25 representing the first white-to-black transition in the scanned line, produced on the first scan of the line, will pass through the switch 39 and then through the open gate 41 to the counter 35. This pulse upon being applied to the counter 35 will disable the counter 35. As a result, the counter 35 will begin counting at the start of the first sweep of a scanned line and will stop counting upon the occurrence of the first white-to-black transition. Thus the count in the counter 35 will digitally represent the distance of this transition from the edge of the area scanned by the flying spot scanner and thus will represent the position of this transition.

The pulse representing the first white-to-black transition passing through the gate 41 is also applied to the 3-bit counter 37 to enable the 3-bit counter 37 to start counting the pulses produced by the clock 33. The counter 37 will count the applied clock pulses until it receives a pulse from channel 27 representing a black-to-white transition or until it reaches its maximum count of the binary number 111. A pulse produced on channel 27 representing a black-to-white transition will disable the counter 37 and stop the counter 37 from counting.

Both of the counters 37 and 35 will not recycle to zero upon reaching their maximum count but merely retain the maximum count of all binary ones upon reaching such count until they are reset to zero by an applied resetting signal. Thus the counter 37 will stop counting either when it receives a pulse channel 27 representing a black-to-white transition or when it reaches a maximum binary count of 111, whichever occurs first. As explained above, a black-to-white transition usually will closely follow a white-to-black transition and, accordingly, a pulse will be produced on channel 27 usually before the 3-bit counter 37 reaches its maximum count. Thus after the counter 37 has been started by a pulse passing through the gate 41 representing the first white-to-black transition in a scanned line, the counter 37 will usually be stopped by a pulse produced on channel 27 representing a black-to-white transition. The binary count in the counter 37 being less than 111 will represent the distance of this black-to-white transition from the preceding white-to-black transition. Additional pulses passing through the gate 41 during the remainder of the horizontal scan following the pulse produced on channel 27 will not restart the counter 37 as the counter 37 will not start counting again after it has been stopped until it receives a reset signal to reset the counter to zero. Thus at the end of the first sweep of the horizontal line, the 10-bit counter 35 will have a count therein representing the horizontal position of the first white-to-black transition in the horizontal line scanned and the counter 37 will have a count therein representing the distance of the following black-to-white transition relative to the preceding white-to-black transition if such black-to-white transition is close enough to the preceding white-to-black transition that it can be represented by a binary number less than 111. Otherwise, the binary counter 37 will contain a binary count of 111 at the end of the first sweep indicating that the black-to-white transition following the first white-to-black transition is greater than can be represented by the count in the 3-bit counter 37.

At the end of the horizontal sweep, the horizontal sweep circuitry 32 produces an output pulse which closes the gate 41 and applies a signal to a 10-bit register 45 and to a 3-bit register 47. Signals representing the binary count stored in the counter 35 are applied to the register 45, which upon receiving the pulse applied from the horizontal sweep circuitry 32 stores the count registered in the counter 35. The register 47 receives signals representing the count registered in the counter 37 and upon receiving a pulse from the horizontal sweep circuitry at the end of the horizontal sweep will store the count registered by the counter 37. This process of storing the counts registered in the counters 35 and 37 in the registers 45 and 47 is referred to as updating the registers 45 and 47. The pulse produced by the horizontal sweep circuitry at the end of the sweep is also applied through a delay circuit 49 to the 10-bit counter 35 and to the 3-bit counter 37 to reset these counters to zero and also to enable the 3-bit counter 37 to be restarted by a pulse passing through the gate 41. Thus at the end of the first scan of a horizontal line the 10-bit register 45 will contain a binary number representing the position of the first white-to-black transition and the 3-bit register 47 will contain a number representing the relative position of the following black-to-white transition or it will contain the binary number 111 if the following black-to-white transition is not located close to the first white-to-black transition. Signals representing the 10-bit binary number stored in the register 45 and representing the 3-bit binary number stored in the register 47 are applied to the modem 31. The pulse produced by the horizontal sweep circuitry 32 at the end of each horizontal scan is also applied to the modem 31 as a synchronizing signal. The modem 31 will convert the applied binary signals to a form suitable for transmission over a telephone line and will transmit the converted signals over a telephone line to a remote receiver as the binary signals are received under the control of the synchronization pulse received from the horizontal sweep circuit 32.

On the second scan of the same horizontal line, assuming that the 3-bit counter 37 did not reach the binary count of 111, the switch 39 will still be in a condition in which it connects the channel 25 to the gate 41. The gate 41 will be closed, having been closed by the pulse produced by the horizontal sweep circuitry 32 at the end of the first horizontal scan. At the start of the second scan, the horizontal sweep circuitry 32 will again produce a pulse to start the 10-bit counter 35 counting. The pulse produced on the channel 25 representing the first white-to-black transition in the scanned line will not stop the counter 35 from counting on this scan because the gate 41 will be closed. At the time this pulse occurs, the counter 35 will reach a count equal to the number registered in the register 45 and this equality will be detected by a comparator 51. In response to detecting this equality, the comparator 51 will apply a signal to the gate 41 to open the gate 41. Since the gate 41 does not open until the count in the counter 35 becomes equal to the number registered in the register 45, which number represents the position of the first white-to-black transition, the gate 41 will not be open until after the pulse representing the first white-to-black transition is produced on channel 25. Since the gate 41 is open immediately following this pulse as a result of the equality of the numbers in the counter 35 and the register 45, the gate 41 will be open when the pulse representing a second white-to-black transition in the scanned line is produced on channel 25. This pulse will pass through the gate 41 and stop the counter 35. Accordingly, the counter 35 will be stopped with the count representing the position of the second white-to-black transition during the second horizontal scan of the line. The pulse representing the second white-to-black transition will be applied to the 3-bit counter 37 to start this counter 37 counting. The counter 37 will again be stopped by the next pulse representing a black-to-white transition on channel 27 provided this pulse occurs binary before the count in the counter 37 reaches 111. At the end of the second horizontal scan, the 10-bit register and the 3-bit register will again be updated to store the new counts registered in the counters 35 and 37, which counts will then be transmitted by the modem 31 over the telephone line. This process will be repeated on each successive scan with the 10-bit counter 35 storing the position of the next succeeding white-to-black transition on the line and the 3-bit counter 37 storing the relative position of the closely following black-to-white transition in the scanned line if the black-to-white transition does closely follow the white-to-black transition. When the binary count in the counter 37 reaches 111, this will indicate that the next balck-to-white transition to have its position determined and transmitted is spaced too far from the preceding white-to-black transition to be represented by a 3-bit number. At the end of the scan in which the binary count in the counter reaches 111, the 3-bit register 47 will be updated and the binary number 111 will be stored in the 3-bit register 47. The presence of this binary number in the register 47 will be detected by a detector 52, which in response to the presence of this binary number in the 3-bit register 47 will apply a signal to the input 43 of the switch 39 so that it switches to connect the channel 27 to the gate 41 rather than the channel 25. The detector 52 will continue to apply the signal to the input 43 to maintain the switch 39 in this condition for as long as the binary number 111 is in the register 47. Accordingly, on the next succeeding scan following the scan in which the 3-bit counter 37 reaches a count of 111, the switch 39 will be switched to the condition in which it connects the channel 27 to the gate 41. On this next succeeding scan the gate 41 will again remain closed until it receives a signal from the comparator 51 and, accordingly, will remain closed until the pulse representing the preceding white-to-black transition, the position of which is represented by the number in the register 45, is produced on channel 25. Thus the gate 41 will remain closed until the scanner has passed this preceding white-to-black transition. The gate 41 will then be opened and be in the condition to pass the next pulse produced on channel 27 representing the next succeeding black-to-white transition following the white-to-black transition, the position of which is represented by the binary number in the register 45. Accordingly, the 10-bit counter 35 will on this scan be stopped at a count representing the position of this black-to-white transition.

Although the counter 37 will receive the pulse representing this transition when it passes through the gate 41, the counter 37 will not start counting because it will also receive simultaneously therewith a stop pulse from the channel 27 which will override the start pulse and prevent the counter 37 from counting. At the end of the sweep, the horizontal sweep circuit 32 will again update the registers 45 and 47. Thus at the end of the sweep following a sweep in which the binary count in the binary counter 37 reaches 111, the 10-bit register 45 will contain a binary number representing the position of the next black-to-white transition following the white-to-black transition the position of which was represented by the previous binary number in the register 45. The 3-bit register 47 at the end of this sweep will register 000. These binary numbers will be transmitted by the modem 31 by telephone line to a remote receiver as has been described. In this manner, the position of each black-to-white and white-to-black transition is transmitted over the telephone line to a remote receiver on successive scannings of the horizontal line. When the positions of all the transitions have been registered in the registers 45 and 47 and transmitted by the modem 31 on the next scan of the line, the gate 41 will not open until after the scanner passes the last transition. As a result, the count in the counter 35 will fill up to its maximum amount and will contain ten ones. At the end of this scan, the binary number 1111111111 will be registered in the register 45 when it is updated. The presence of this binary number will be detected by a detector 53 as indicating that positions of all of the transitions in the horizontal line being scanned have been transmitted. The detector 53 in response to receiving this binary number will produce an output signal which is applied to the vertical deflection circuitry 55 of the flying spot scanner 11. In response to receiving this signal the vertical deflection circuitry will step the vertical deflection one horizontal line so that the flying spot scanner on the next scan will scan the next adjacent horizontal line. The output signal produced by the detector 53 in response to the binary number 1111111111 being registered in the 10-bit register 45 also is applied to the gate 41 to open it so that the gate 41 will be open at the start of the first scan of the next horizontal line.

Accordingly, the pulse representing the first white-to-black transition in the next scanned line will pass through the gate 41 to the counter 35. The system will then proceed to detect the position of and transmit digital numbers representing the position of the transitions of the next horizontal line in the same manner as described above. The system will transmit the transitions in this manner in each horizontal line until the positions of all the transitions in all the horizontal lines have been transmitted. In this manner the system efficiently produces and transmits to a remote receiver digital signals from which the original document can be duplicated.

Figure 5:
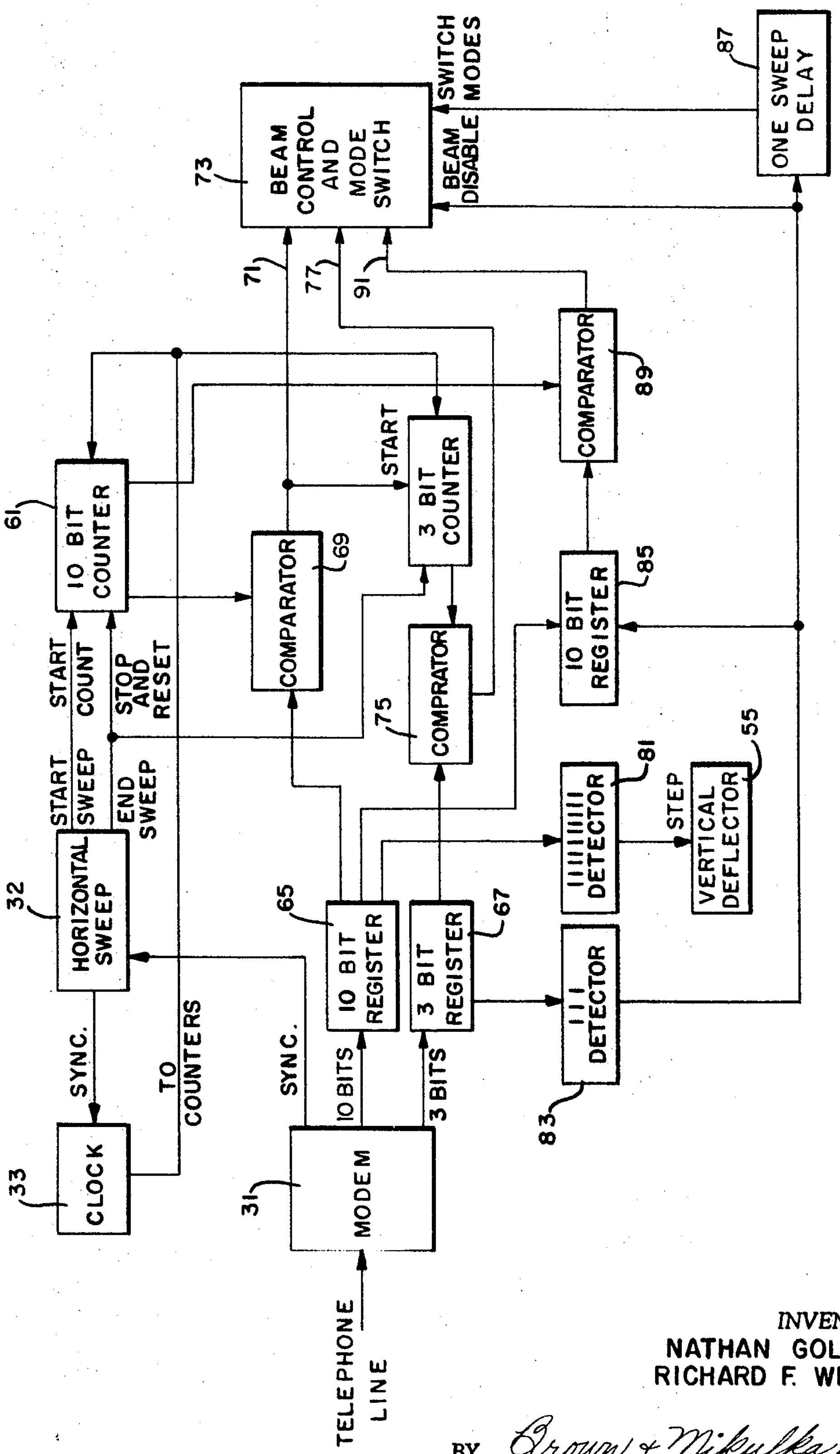
FIG. 5 is a more detailed block diagram illustrating the system of the present invention when operating as a receiver.

The receiving system illustrated in FIG. 5 also makes use of the horizontal sweep circuit 32 and the clock 33. Since most of the other components shown in the system of FIG. 5 are also found in the transmitting system of FIG. 4, the same components may be used in the system of FIG. 5 simply by reconnecting them as illustrated in FIG. 5. However, since they are connected in a different manner and may be different components they are given different reference numbers in FIG. 5. The modem 31 receives the transmitted signals from the telephone line, which signals were transmitted as has been described with reference to FIG. 4. The modem 31 converts the received signals into the 10-bit binary numbers which they represent and also the 3-bit binary numbers represented thereby. Each set of signals received will represent one 10-bit number from the register 45 in the transmitter and one 3-bit number from the register 47. A sync signal in the form of a pulse for each set of received signals is also derived from the received signals. The sync signal is applied to the horizontal sweep circuitry 32 to synchronize the sweep signal generated thereby, which sweep signal is applied to the flying spot scanner. As in the system of FIG. 4, the horizontal sweep circuitry 32 also applies a synchronizing signal to the clock 33 to synchronize it with the sweep signal. The clock 33 as in the system of FIG. 4 generates 1,024 clock pulses during each horizontal sweep of the flying spot scanner. As shown in FIG. 5, the pulses produced by the clock 33 are applied to a 10-bit binary counter 61 and to a 3-bit binary counter 63. Each set of signals representing a 10-bit binary number and a 3-bit binary number received from the telephone line by the modem 31 is converted into the corresponding 10-bit binary number and 3-bit binary number. The 10-bit binary number is stored in a 10-bit register 65 and the 3-bit binary number is stored in a 3-bit register 67. As each horizontal sweep begins by the horizontal sweep circuit 32 in synchronism with the received data, the horizontal sweep circuit 32 applies a signal to the 10-bit counter 61 to enable it to start counting the clock pulses applied thereto by the clock 33. The count registered by the counter 61 is applied continuously to a comparator 69 as is the number registered by the 10-bit register 65. When the count in the 10-bit counter equals the count in the 10-bit register 65, the comparator 69 will apply a signal to the input 71 of the beam control and mode switch 73. In response to receiving this signal, the beam control and mode switch 73 will turn the beam on in the flying spot scanner, which up to this time will have been turned off. The output signal produced by the comparator 69 in response to the count in the counter 61 equaling the binary number registered in the register 65 is also applied to the 3-bit counter 63 to start the 3-bit counter counting the applied clock pulses. The count in the 3-bit counter 63 is applied to a comparator 75, which also receives signals representing the number stored in the 3-bit register 67. When the comparator 75 detects that the count in the 3-bit counter 63 equals the binary number registered in the register 67, the comparator 75 applies a signal to the input 77 of the beam control and mode switch causing the beam control and mode switch to turn off. Thus upon a 10-bit binary number being registered in the 10-bit register 65 and a 3-bit number being registered in the register 63, which 3-bit number is not the binary number 111, the horizontal sweep will initiate the sweep signal applied to the flying spot scanner to start a horizontal scan thereof. At the start of the scan, the beam will be turned off. When the count in the 10-bit counter 61 equals that in the 10-bit register 65, the beam will be turned on during the scan and then will be turned off when the count in the 3-bit counter 63 equals that in the 3-bit register 67. At the end of the horizontal sweep signal, the sweep circuit 32 will produce an output pulse which stops and resets the counter 61 to zero and also resets the counter 63 to zero. This process is then repeated on the next scan of the same line. In this manner, the beam is turned on and turned off at the right position to reproduce a small black area in the scanned line when the 3-bit binary number stored in the register 67 is not all ones. The scanner continues to scan the same line as each new 10-bit and 3-bit number is received until the 10-bit register receives the binary number 1111111111 indicating that all of the transitions in the horizontal line have been sent. The presence of this number in 10-bit register 65 will be detected by the detector 81, which in response to this number will apply a signal to the vertical deflection circuitry 55 of the flying spot scanner causing it to step to the next adjacent line and the process will be repeated.

When the 3-bit register 67 receives the binary number 111 this will indicate that the black-to-white transition following the white-to-black transition, the position of which is represented by the number stored in the 10-bit register 65, does not follow closely enough to this white-to-black transition to be represented by a 3-bit number. The presence of the binary number 111 in the 3-bit register 67 is detected by a detector 83, which in response to detecting this number applies a signal to a 10-bit register 85 to cause the binary number stored in the register 65 to be transferred into the register 85. The detector 83 also applies a signal to the beam control mode switch 73, which in response to this applied signal, maintains the beam turned off during the entire sweep while the signal is applied from the detector 83. The signal produced by the detector 83 in response to the binary number 111 being in the register 87 is also applied to a one sweep delay circuit 87, which comprises a one shot multivibrator. In response to receiving a signal from the detector 83, the circuit 87 applies a signal to the beam control and mode switch until the completion of the horizontal sweep which follows the receipt of the next 10-bit number and 3-bit number received by the registers 65 and 67. This changes the operation of the beam control and mode switch in a manner described below. When the next numbers are received in the registers 65 and 67, the register 67 will contain all zeros since the preceding number contained by the register 67 contained all ones. The register 65 will contain a binary number representing the horizontal position of the black-to-white transition following a white-to-black transition, the position of which is now represented by the number stored in the register 85. As in the other horizontal sweeps, the 10-bit counter 61 will begin counting at the start of the horizontal sweep in response to the signal applied from the horizontal sweep circuit 32. The counter 61 will first reach a count equal to that registered in the register 85 and then will reach a count equal to that registered in the register 65. The signals representing the binary numbers stored in the register 85 are applied to a comparator 89, which is also connected to receive signals representing the count in the counter 61. When the count in the counter 61 reaches a count equal to the count registered in the counter 85, the comparator 89 will produce an output signal which is applied to the input 91 of the beam control and mode switch 73. The beam control and mode switch 73, having switched modes in response to the signal being applied by the one sweep delay circuit 87, in response to the signal applied at input 91, will turn the beam in the flying spot scanner on. When the comparator 69 applies a signal to the input 71 in response to the count in the counter 61 reaching the binary number in the register 65, the beam control and mode switch 73 will turn the beam off. Thus the beam will be turned on at a position corresponding to the count registered in the register 85 and will be turned off at a position corresponding to the count registered in the register 65 on the sweep following the sweep in which the 3-bit binary number 111 is registered in the register 67. In this manner, the beam is made to turn on at the right position to start recording a black portion and turn off at the right position to stop recording a black portion when the black-to-white transition following a white-to-black transition can not be represented by a 3-bit binary number. In this manner, the receiver will duplicate the original document from the digital signals received by the modem 31.

Figure 6:
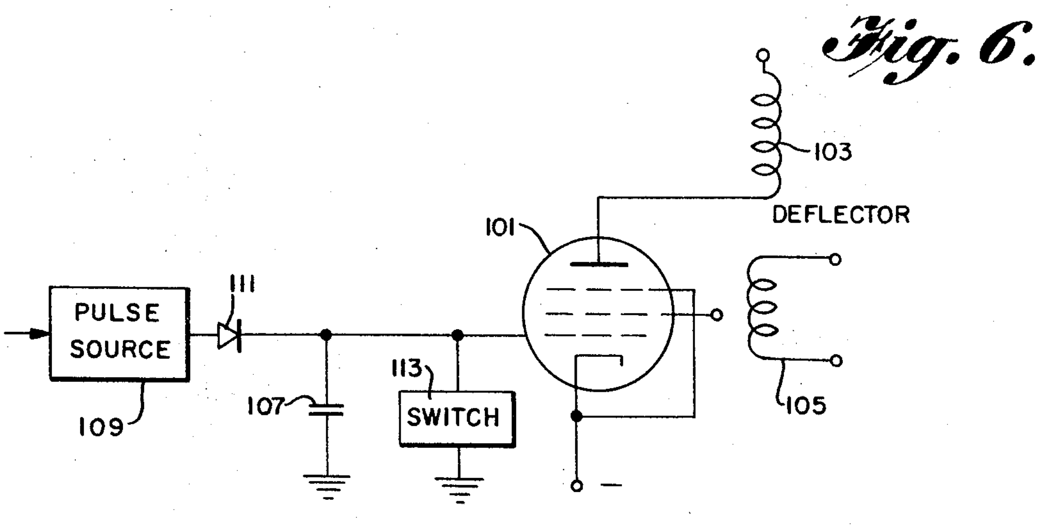
FIG. 6 is a circuit diagram illustrating how the vertical deflection of the flying spot scanner used in the system of the present invention is controlled; and, FIG. 7 is a block diagram illustrating the details of one of the blocks in the system of FIG. 5.

The circuit for controlling the vertical deflection of the scanner 11, as shown in FIG. 6, comprises a pentode 101, the cathode of which is connected to a negative potential and the plate of which is connected through a vertical deflection coil 103 of the scanner to a source of positive potential or B+. A bias current is applied to a second vertical deflection coil 105 of the scanner so that when no current is applied to the coil 103, the electron beam produced by the scanner will be deflected to the top of the field to be scanned. The suppressor grid and the screen grid of the pentode are connected conventionally with the suppressor grid being connected directly to the cathode and the screen grid being connected to a bias potential. A capacitor 107 is connected between the control grid of the pentode and ground. The potential across the capacitor 107 controls the conductivity of the pentode 101 and thus controls the vertical deflection of the scanner. At the start of the scan of a document, the capacitor 107 will have no charge on it so that the scanner will scan the top line of the document. When the system has completed the encoding of all the transitions in the top line and the detector 53 in the transmitter or the detector 81 applies a signal to the vertical deflection circuit 55 to cause it to step the scanning to the next adjacent line, this signal is applied to a pulse source 109 which in response to receiving the signal will apply a constant impulse content pulse through a diode 111 to apply a predetermined charge to the capacitor 107. This will increase the voltage across the capacitor 107 by a predetermined increment and, accordingly, the conductivity of the pentode 101 will be increased so that on the next horizontal scan the scanner will scan the second line from the top of the field. Each time the detector applies a signal to the pulse source 109 at the completion of the encoding of all the transitions in a line, the pulse source 109 will apply a constant impulse content pulse to the capacitor 107 and in this manner the vertical deflection is incrementally stepped in response to the applied signal. The switch 113 is used to discharge the capacitor 107 after the completion of the scan of an entire page.

Figure 7:
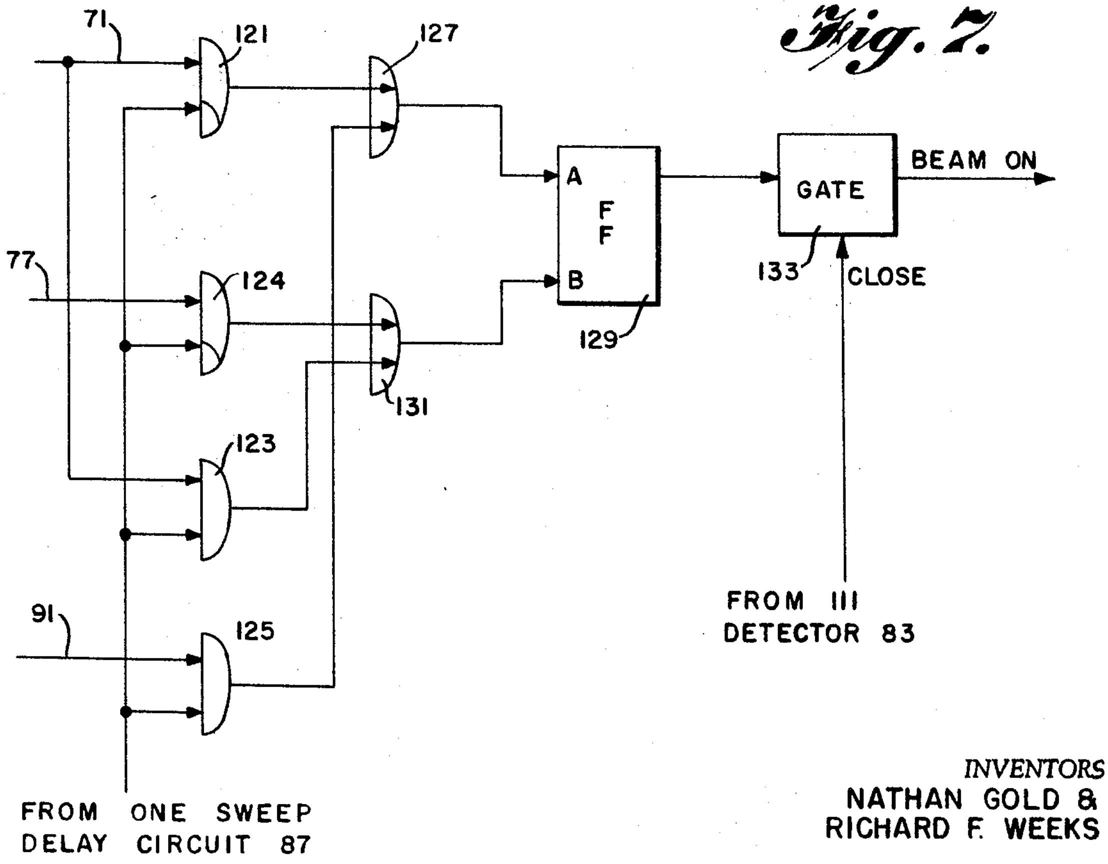

FIG. 7 is a block diagram illustrating the details of the beam control and mode switch 73. As shown in FIG. 7, the input signal applied to the input 71 from the comparator 69 is applied to a normally open gate 121 and to a normally closed gate 123. The signal from the comparator 75 applied to input 77 is applied to a normally open gate 124. The signal from the comparator 89 applied to input 91 is applied to a normally closed gate 125. When the one sweep delay circuit 87 applies a signal to the beam control and mode switch 73, this signal will disable the gates 121 and 124 and enable the gates 123 and 125. Under normal conditions, when the one sweep delay circuit 87 is not applying a signal to the beam control and mode switch 73, a signal from the comparator 69 applied to the input 71 will pass through the normally open gate 121 and through an OR gate 127 to set a flip-flop 129 into its A state. Then when the comparator 75 applies a signal to the input 77, the signal will pass through the gate 124 and through an OR gate 131 to reset the flip-flop 129 back in its B state. While the flip-flop 129 is in its A state it will produce an output signal which will pass through a normally open gate 133 and turn the beam of the scanner 11 on. The beam of the scanner will remain on until the flip-flop 129 switches back to its B state terminating the signal. Thus the beam of the scanner will be turned on in response to the signal applied to the input 71 and will be turned off in response to the signal applied to the input 77. When the delay circuit 87 applies a signal to the beam control and mode switch to cause it to switch modes enabling the gates 123 and 125 and disabling the gates 121 and 124, a signal from the comparator 89 applied to the input 91 will pass through the gate 125 and through the OR gate 127 to set the flip-flop 129 in its A state. Then when a signal from the comparator 69 is applied to the input 71, this signal will pass through the gate 123 and through the OR gate 131 to reset the flip-flop 129 back in its B state. While the flip-flop is in its A state, it will produce a signal passing through the normally open gate 133 to turn the beam on. Thus when the mode of the beam control and mode switch 73 has been switched, the beam will be turned on in response to a signal applied to the input 91 and will be turned off in response to a signal applied to the input 71. To prevent the beam from being turned on when the detector 83 is producing an output signal, a signal from the detector 83 is applied to the gate 133 to close the gate 133 while the signal is applied.

The above described facsimile system for duplicating a document by means of digital signal signals transmitted over a telephone line will perform the desired duplication rapidly and the system can be implemented with relatively inexpensive equipment. The above described system has been described as duplicating a document which comprises black lines on a white background or dark lines on a light background. The system can be easily converted to duplicate a negative type document which comprises white or light lines on a black or dark background. This could be accomplished by simply providing a polarity inversion in the transition detector. Instead of stepping the vertical deflection of the flying spot scanner as described in the above system, the original document being transmitted and the duplicate document being reproduced could be incrementally advanced mechanically when all the transitions of a given horizontal line have been transmitted and reproduced. These and many other modifications may be made to the above described specific embodiment without departing from the spirit and scope of the invention, which is defined in the appended claims.

We claim:

1. A facsimile transmitter for generating signals from which a document can be duplicated comprising means to scan the document to be duplicated, detecting means to detect transitions in said document as it is scanned by said scanning means, control means responsive to said detecting means to control said scanning means to scan the portions of said document containing transitions repeatedly and to scan portions of said documents containing no transitions a smaller number of times then said portions containing transitions are scanned, said control means including means to generate signals to a remote receiver, representing the positions of said transitions, synchronously with said scan of said document.

2. The invention as described in claim 1, wherein said synchronously generated signals comprise a fixed predetermined number of binary bits.

3. A facsimile transmitter as recited in claim 1, wherein said control means controls said scanning means to scan portions of said document containing no transitions only once.

4. A facsimile transmitter as recited in claim 1, wherein said control means controls said scanning means to scan successive parallel lines in said document and includes means responsive to said detecting means failing to detect a transition in a line to step said scanning means to scan the next successive line on said document to be duplicated.

5. A facsimile transmitter for generating signals from which a document can be duplicated to a remote receiver, comprising means to scan the document to be duplicated, detecting means to detect transitions in said document as it is scanned by said scanning means, control means to cause said scanning means to scan different lines of said document in succession and to scan the lines of said document containing transitions repeatedly, said control means including means to generate signals to said remote receiver synchronously with said scan and representing the positions of a small number of different transitions during each successive scan of the same line.

6. A facsimile receiver for receiving signals generated by a facsimile transmitter as recited in claim 5 and including means to produce a facsimile of said document to be transmitted from said received signals.

7. A facsimile system comprising a transmitter as recited in claim 5, and a facsimile receiver in a location remote from said transmitter adapted to receive signals generated by said transmitter, said receiver including means to produce facsimile of said original document from the signals received from said transmitter.

8. A facsimile transmitter as recited in claim 5, wherein the number of transition positions which are represented by signals generated on each scan of a line is less than three.

9. A facsimile transmitter as recited in claim 5, wherein said means to generate signals generates digital signals representing the positions of said transitions.

10. A facsimile transmitter as recited in claim 5, wherein said control means includes means to generate signals representing the positions of transitions of a first type and signals representing the positions of transitions of a second type relative to the positions of said transitions of said first type.

11. A facsimile transmitter as recited in claim 10, wherein said transitions of said first type in light-to-dark transitions and said transitions of said second type are dark-to-light transitions.

12. A facsimile transmitter as recited in claim 10, wherein said means to generate signals generates binary signals of a first number of bits to represent each position of the transitions of said first type and generates binary signals of a second number of bits less than said first number of bits to represent each of the positions of the transitions of said second type relative to the positions of said transitions of said first type.

13. A facsimile transmitter as recited in claim 10, wherein said generating means is operable to generate signals representing the position of a transition of said first type and the position of the next succeeding transition of said second type relative to the position of the preceding transition of said first type on the same scan of the line only if such next succeeding transition of said second type is within a predetermined distance of such preceding transition of said first type, said generating means generating signals representing the position of such next succeeding transition of said second type on the next succeeding scan of the same line if the distance of such next succeeding transition from such preceding transition of said first type is greater than said predetermined distance.

14. A method of duplicating a document at a remote location comprising scanning the portions of said document containing transitions repeatedly, scanning portions of said document containing no transitions a fewer number of times than said portions containing transitions are scanned, generating signals representing the positions of said transitions as said transitions are scanned, transmitting said signals to a remote location synchronously with said scanning, and producing a facsimile of said document from said signals.

15. A method of duplicating a document at a remote location as recited in claim 14 wherein the step of generating signals representing the positions of said transitions comprises generating signals to represent the positions of transitions of a first type relative to a reference line, generating signals to represent the positions of each transition of a second type relative to the positions of preceding transitions of said first type if such transitions of said second type are within a predetermined distance of the preceding transitions of said first type.

16. A facsimile transmitter for generating signals from which a document can be duplicated, comprising:

- means to scan the document line by line;
- means to detect transitions in said document during the scanning thereof; and
- means connected to said detecting means for generating digital signals representing the positions of transitions of first and second types during each line scan; said signals comprising a fixed word length for transitions of said first type and a variable word length for transitions of said second type.

17. The invention as delineated in claim 16, wherein said fixed word length signal contains a predetermined number of binary bits and said variable word length signal contains a predetermined number of binary bits which varies as a function of the location of transitions of said second type with respect to ones of said first type.

18. The invention as stated in claim 17, wherein the number of bits comprising said variable word length varies from a predetermined amount only when the distance between transitions of said first and second types exceeds a predetermined amount.

19. The invention as set forth in claim 18, further including means for transmitting said transition position information to a remote receiver synchronously with each line scan via a fixed number of binary bits.

20. A facsimile transmitter for generating signals from which a document may be duplicated to a remote receiver, including:

- means to scan said document line by line;
- means to detect transitions of different types in said document;
- first means for generating binary coded digital signals responsive to a first type of detected transition;
- second means for generating binary coded digital signals responsive to a second type of detected transition; and
- means for causing said first means to generate binary coded digital signals responsive to said second type of detected transition when said second type of detected transition occurs beyond a predetermined distance from said first type of detected transition.

21. A receiver for reproducing a facsimile of a document transmitted from a remote transmitter, including:

first means for receiving and storing binary coded digital signals corresponding to transitions occurring in said document;

second means for receiving and storing binary coded signals corresponding to transitions occurring in said document;

means for reproducing a facsimile of transitions of a first type in response to said digital signals received and stored in said first means;

means for reproducing a facsimile of transitions of a second type in response to said digital signals received and stored in said second means; and means for causing said facsimile transition reproducing means to reproduce facsimiles of transitions of said second type in response to signals received and stored in said first means when transitions of said second type are positioned beyond a predetermined distance from transitions of said first type.